US00RE33984E

United States Patent [19]

Spitler

[11] E Patent Number: Re. 33,984

[45] Reissued Date of Patent: Jul. 7, 1992

[54] CLUTCH DAMPER ASSEMBLY

[75] Inventor: Wayne L. Spitler, Ludlow Falls, Ohio

[73] Assignee: General Motors Corporation, Detroit, Mich.

[21] Appl. No.: 740,782

[22] Filed: Aug. 6, 1991

Related U.S. Patent Documents

Reissue of:

[64] Patent No.: 5,009,301
Issued: Apr. 23, 1991
Appl. No.: 531,612
Filed: Jun. 1, 1990

[51] Int. Cl.[5] ..... F16D 3/14
[52] U.S. Cl. ..... 192/106.2; 464/68
[58] Field of Search ..... 192/106.1, 106.2; 464/64, 66, 67, 68

[56] References Cited

U.S. PATENT DOCUMENTS

| | | | |
|---|---|---|---|
| 3,101,600 | 8/1968 | Stromberg | 192/106.2 |
| 4,148,200 | 4/1979 | Schallhorn et al. | 192/106.1 |
| 4,188,805 | 2/1980 | Fall et al. | 192/106.2 |
| 4,302,951 | 12/1981 | Fall et al. | 192/106.1 |
| 4,451,244 | 5/1984 | Lamarche | 464/68 |
| 4,485,908 | 12/1984 | Gatewood | 192/106.2 |
| 4,573,374 | 3/1986 | Koshimo et al. | 192/106.2 |
| 4,782,932 | 11/1988 | Janson | 192/106.2 |
| 4,787,877 | 11/1988 | Nagao et al. | 192/106.1 |

*Primary Examiner*—Leslie A. Braun
*Assistant Examiner*—Nicholas Whitelaw
*Attorney, Agent, or Firm*—Donald F. Scherer

[57] ABSTRACT

A power transmitting clutch has a transient torque damper with a floating ring and spring members disposed in torque transmitting relation between an input member and an output member. The floating ring has a pair of stop surfaces that are axially and radially aligned with stop surfaces on the input member and output member respectively. Cooperation between the stop members limits the amount of spring compression and the relative angular excursion between the input member and the ring and between the ring and the output member.

2 Claims, 2 Drawing Sheets

CLUTCH DAMPER ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to power transmitting clutches and more particularly to such clutches having spring dampers with excursion limiting devices.

Prior art damper mechanisms for power transmitting clutches generally provide for limiting angular excursion by utilizing the solid height of the spring. While this approach is effective, it quite often results in inordinate stresses being induced within the springs. To counter this condition, it has been suggested that a positive stop member be placed on either the input member or output member of the clutch in a position to abut the other member thus limiting the angular excursion of the input member relative to the output member. The stop member is usually a pin or other axially extending member secured to either the input or output member and extending into the path of travel of the other member.

While this scheme is effective with single phase dampers, it loses some of its effectiveness with serially arranged spring dampers. In serially arranged dampers, at least one set of the damper springs must reach solid height to take full advantage of the spring rates unless centrally disposed pins or extended spring seats are employed. These members must be installed at assembly therefore require additional processing.

The use of rivets secured to one member, i.e., the input, and a surface on the other member, i.e., output can operate as the stop devices. These devices require additional installation operations during the manufacture of the clutch assembly. Each rivet must be installed or positioned during manufacture. The insertion of one or more rivets can be overlooked resulting in the damper reverting to solid spring height as the stop structure.

SUMMARY OF THE INVENTION

The present invention provides an improved stop structure for spring dampers. The clutch input member and the output member are stamped metal components. During the stamping operation, portions of the metal components are formed to provide stop surfaces. In serially arranged spring dampers, a floating ring is provided between adjacent spring packs intermediate the input member and the output member. The floating ring member is also a stamped metal component which has stop surfaces formed thereon during stamping.

During clutch assembly, the stop surfaces on the ring member are aligned with respective stop surfaces on the input member and the output member. This permits first and second stage stop positions to be incorporated into the clutch assembly. One stage will limit the angular excursion between the input member and the ring, while the other stage limits the angular excursion between the ring and the output member. The present invention, therefor, allows a wide latitude in damper design and in the spring rates used in the first and second stages. Since the stop surfaces are an integral part of the sheet metal components, they cannot be inadvertently omitted at assembly.

It is an object of this invention to provide an improved clutch and damper assembly wherein the damper includes an input member, an output member, a floating ring member and spring packs serially arranged between the members, and further wherein the input and output members have stop surfaces formed thereon and the ring member has stop surfaces radially and axially aligned with respective ones of the stop surfaces on the input and output members, whereby the stop surfaces cooperate to provide limited angular excursion between the input member and the ring member during one stage of damping and between the ring member and the output member during another stage of damping.

It in another object of this invention to provide an improved clutch and damper assembly as defined in the preceding object wherein the stop surfaces are integrally formed on the respective clutch and damper components.

It is a further object of this invention to provide an improved clutch and damper assembly wherein a plurality of stop surfaces are provided to establish limits for the angular excursion between components of the assembly in a sequential order for serially arranged damper springs.

These and other objects and advantages of the present invention will be more apparent from the following description and drawings.

DESCRIPTION OF THE EXEMPLARY EMBODIMENT

Figure 1:
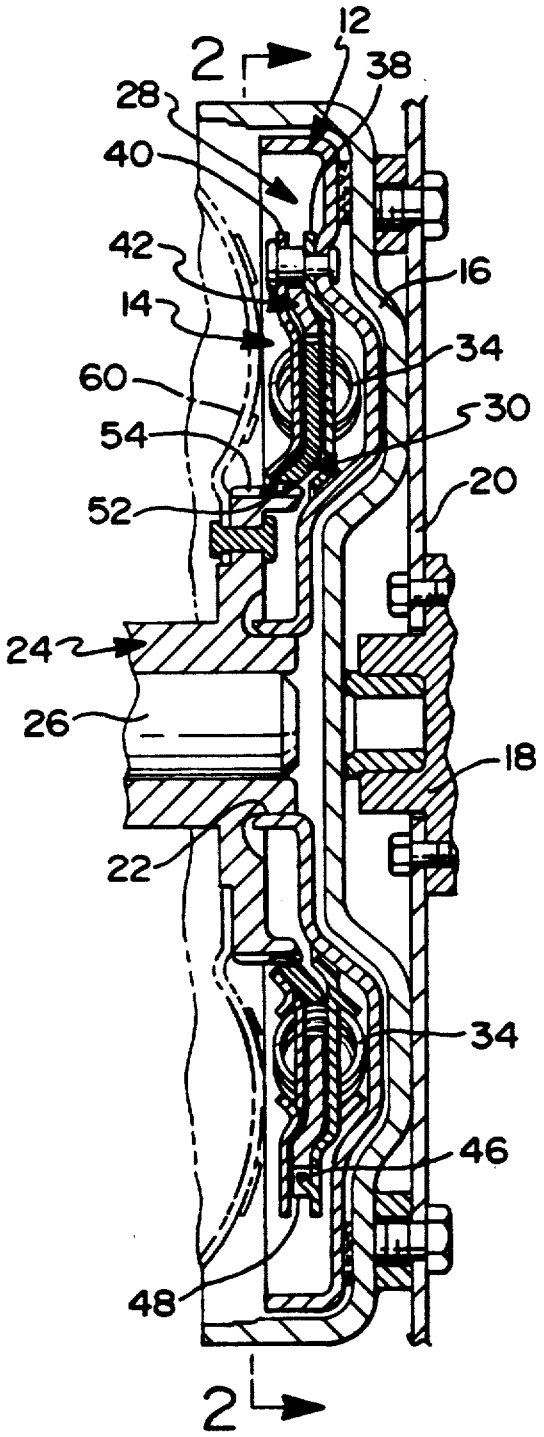
FIG. 1 is a cross-sectional elevational view of an exemplary embodiment of a clutch and damper assembly incorporating the present invention.

Referring to the drawings, wherein like characters represent the same or corresponding parts throughout the several views, there is seen a clutch and damper assembly, generally designated 10, comprised of the clutch disc 12 and a damper assembly 14. The clutch disc 12 is operated in a conventional manner by hydraulic fluid to provide controlled engagement and disengagement between the clutch disc 12 and an input shell 16, which in turn is secured to an engine crankshaft 18 through a conventional flex plate 20. The clutch disc 12 has an inner diameter 22 which is rotatably supported on a clutch output hub 24, which in turn is drivingly connected with a transmission input shaft 26.

The damper assembly 14 includes an input plate assembly 28, an output driven member 30, a floating or intermediate ring member 32, and a plurality of compression springs 34 and 36. The compression springs 34 are disposed between the input plate assembly 28 and the intermediate ring 32, while the springs 36 are disposed between the intermediate ring 32 and the output driven member 30.

The input driven plate assembly 28 includes a pair of spaced annular members 38 and 40. The annular members 38 and 40 are preferably stamped metal components. The members 38 and 40 are secured together and axially spaced by a plurality of rivets 42 with each member 38 and 40 having a plurality of aligned spring seats 44 which are adapted to abut one end of the respective springs 34. The annular member 38 has input stop members or stop surfaces 46 formed thereon which are axially and radially aligned to engage stop members or surfaces 48 formed on the intermediate ring 32.

The output driven member 30 has a plurality of spring seats 50 aligned to contact one end of the respective springs 36. The output driven member 30 has an inner spline diameter 52 which drivingly engages the spline 54 formed on the clutch output hub 24 to thereby provide a positive drive connection between these elements. The output member 30 has formed thereon a plurality of stop members or surfaces 56 which are radially and axially aligned to contact a plurality of stop members or surface 58 which are formed on the intermediate ring 32.

Figure 2:
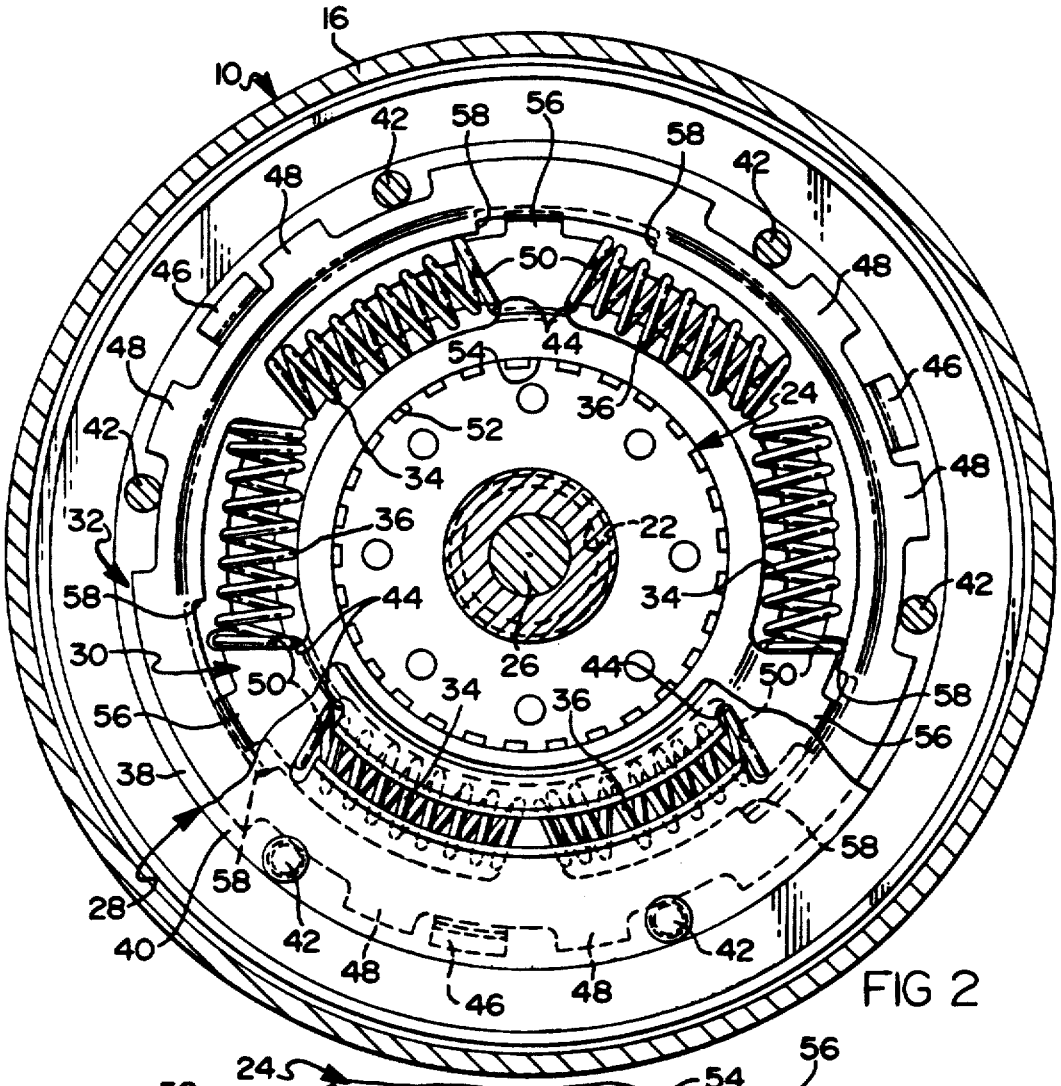
FIG. 2 is a view taken along line 2—2 in FIG. 1 showing the damper in the "at rest" position.
Figure 3:
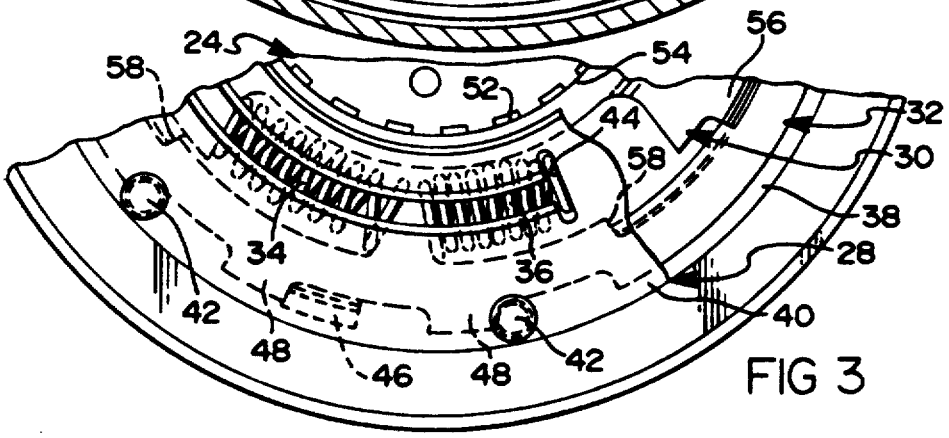
FIG. 3 is a partial view, similar to FIG. 2, with the damper in the position for limiting further angular excursion.

When the clutch and damper assembly 10 is disengaged, there is no torque transmitted through the damper assembly and hence no damping action. When the clutch is disengaged, all of the engine power flows through the input shell 16 to a conventional torque converter impeller, not shown, from which the power is delivered to a torque converter turbine 60, shown in phantom, which is drivingly connected with the output hub 24. The torque converter, being a hydraulic transmission device, is an excellent damper of torsional vibrations. When the damper assembly 10 is in the non-transmitting mode, shown in FIG. 2, the spring seats 44, on members 38 and 40, and the spring seats 50, on the member 30, are radially aligned so that each side of the respective seats will contact one of the respective springs 34–36. When the damper assembly 10 is transmitting torque, as seen in FIG. 3, the spring seats 44 and 50 will be rotated out of radial alignment whereby only one side of each spring seat will be contacted by a spring. During forward torque transmission, spring seats 44 contact springs 34 and spring seats 50 contact springs 36. During reverse torque transmission, i.e., engine braking, the spring seats 44 and 50 contact the springs 36 and 34, respectively.

To improve the economy of the transmission, the clutch and damper assembly 10 is energized to provide a direct drive connection between the input shell 16 and the transmission input shaft 26 thereby eliminating the inherent hydraulic losses associated with torque converters. However, the clutch and damper assembly 10 is a mechanical drive transmitting device which is capable of transmitting the engine torque while reducing the transient torsional vibrations occurring at the crankshaft 18. The damping function is provided by the springs 34 and 36 and by friction elements disposed between the annular members 38 and 40 and the output member 30. The general damping operation of such assemblies is well known.

The deflection of the springs 34 and 36 is dependent upon the torque level and the transient torque spikes. The springs 34 are effective to transient torque from the input plate assembly 28 to the floating ring 32, while the springs 36 are effective to transmit torque from the intermediate ring 32 to the output driven member 30. The springs 34 will deflect under the torque load in accordance with the spring rate designed into the springs. The springs 36 will also deflect in accordance with the designed spring rate.

It is desirable to provide different spring rates for the springs 34 and 36 such that the angular excursion between the input plate assembly 28 and the output member 30 will have at least two phases or stages. When this is undertaken, the spring rate in the springs 34 is generally of a lesser value than the spring rate of springs 36. This will normally result in the springs 34 being compressed to their solid height prior to the springs 36 reaching the limit of their compression.

To prevent the springs 34 from reaching their solid height, the stop member 46 on the input driven assembly 28 will contact the stop surfaces 48 on the intermediate ring 32. Further compression of the springs 34 is prevented. Until the stop member 46 is effective, the force in spring 34 will be equal to the force in spring 36. The springs 36 will continue to be compressed as the torque level is increased. The force in spring 36 will be greater than the force in spring 34 because the drive torque is now transmitted via the stop member 46 and stop surface 48. To prevent the springs 36 from reaching their solid height, stop surfaces 58 on the ring 32 will come into abutment with the stop surfaces 56 on the output member 30, thus preventing further deflection or compression of the springs 36.

When the stop surfaces 46, 48 and 56, 58 are in abutment, the damping qualities of the clutch and damper assembly 10 are no longer available. However, the springs 34 and 36 are protected from being compressed to their solid heights which improves the life of the springs 34 and 36.

Every spring damper has a limit to the amount of torque that can be transmitted within the effective damping range. As a general rule, the staged damping range is limited in the currently available spring dampers by the solid height of the springs or by stop members disposed between the damper input and the damper output. By utilizing the present invention, a staged damping is accomplished while eliminating the potential for the damping springs being compressed to their solid height.

This is in contrast to the staged dampers provided by the prior art wherein either one or both sets of springs must reach solid height or if a stop structure between the input and output members is provided, at least one set of damper springs will reach solid height.

As will be apparent from a study of the above description and drawings, the stop surfaces of the present invention are formed integrally with the damper members such that assembly of the damper will provide proper alignment of these surfaces. This is in contrast to the prior art dampers which utilize separate members as at least a portion of the damper limiting means and therefore can be either omitted or incorrectly installed during assembly. Also, since the stop structures of the present invention are formed as integral components on the stamped damper members, the assembly time is reduced thereby providing cost advantages to dampers utilizing the present invention.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A clutch and damper comprising: a clutch input member having spring seating means and an input stop member; an intermediate member having spaced first and second spring seating means and first and second stop surfaces with one of said stop surfaces being radially and axially aligned with said input stop member; a clutch output member having spring seating means and an output stop member radially and axially aligned with the other of said first and second stop surfaces; first spring means disposed between said clutch input member spring seating means and the first spring seating means for permitting relative angular movement between said clutch input member and said intermediate member; and second spring means disposed between said clutch output member spring seating means and the second spring seating means for permitting relative angular movement between said intermediate member and said clutch output member, said input stop member and said one stop surface cooperating to limit the relative angular movement between said clutch input member and said intermediate member and said output stop member and said other stop member cooperating to limit the relative angular movement between said intermediate member and said clutch output member.

2. A clutch and damper comprising: a clutch input member having a pair of axially spaced annular members joined together for common rotation about an axis and each annular member having a plurality of spaced spring seating means and one of said annular members having an input stop member displaced axially toward the other of said annular members; an intermediate member having spaced first and second spring seating means and first and second stop surfaces with one of said stop surfaces being radially and axially aligned with said input stop member; a clutch output member having an annular body portion with spring seating means extending radially between the spring seating means on said annular members and an output stop member radially and axially aligned with the other of said first and second stop surfaces on said intermediate member; first spring means disposed between said clutch input member spring seating means and the first spring seating means for permitting relative angular movement between said clutch input member and said intermediate member; and second spring means disposed between said clutch output member spring seating means and the second spring seating means for permitting relative angular movement between said intermediate member and said clutch output member, said input stop member and said one stop surface cooperating to limit the relative angular movement between said clutch input member and said intermediate member and said output stop member and said other stop member cooperating to limit the relative angular movement between said intermediate member and said clutch output member.

* * * * *